United States Patent Office 2,957,830
Patented Oct. 25, 1960

2,957,830
PROCESS FOR PRODUCING ELECTROLUMINESCENT PHOSPHORS

Paul Goldberg, Long Beach, and Albert K. Levine, Brooklyn, N.Y., assignors to Sylvania Electric Products Inc., a corporation of Delaware No Drawing. Filed Mar. 19, 1959, Ser. No. 800,369

4 Claims. (Cl. 252—301.6)

Our invention relates to processes for making electroluminescent phosphors.

Electroluminescent phosphors are phosphors which emit light in the presence of an electric field. One type of phosphor, known as the zinc sulfide type of electroluminescent phosphor, includes together with suitable activators and coactivators, those phosphors wherein up to 20 mole percent of cadmium can be substituted for an equivalent mole percent of zinc and wherein up to 30% mole percent of selenium can be substituted for an equivalent mole percent of sulphur. Conventionally, such phosphors are dispersed in dielectric media and the dispersion is placed between two electrically conductive electrodes, at least one of which permits the passage of light therethrough to produce an electroluminescent lamp. A voltage is applied between the two electrodes and light is emitted from the dispersion.

It is known to the art that the limiting factor in producing extremely thin phosphor-dielectric layers, as employed in electroluminescent layers and similar devices, is the size of the largest phosphor grains or particles present. Such layers are needed to permit the highest possible field strength for a specified applied voltage.

Accordingly, it is an object of our invention to provide a new and improved process for reducing the particle size of electroluminescent phosphors of the zinc sulfide type.

Another object is to decrease the particle size of electroluminescent phosphors of the zinc sulfide type without impairing the brightness or efficiency of those phosphors.

Still another object is to provide a new process for producing electroluminescent phosphors of the zinc sulfide type, wherein the particle size of the phosphors is so reduced that extremely thin phosphor-dielectric layers can be produced.

In the copending application of Paul Goldberg and Allen L. Solomon, Serial No. 705,750, filed December 30, 1957, there is disclosed a new process for producing electroluminescent phosphors of sharply increased brightness. In accordance with this process a copper activator and at least one halide coactivator selected from the class consisting of chloride, iodide and bromide, are added to a base material of the zinc sulfide type wherein up to 20 mole percent of cadmium can be substituted for an equivalent mole percent of zinc and wherein up to 30 mole percent of selenium can be substituted for an equivalent mole percent of sulfur. The resultant mixture is then fired to a temperature falling within the approximate range 1000°–1300° C. to produce an intermediate phosphor product having a copper activator concentration falling within the approximate range $1 \times 10^{-4}$ to $5 \times 10^{-3}$ gram atoms per mole of base material, and a halide coactivator concentration also falling within the approximate range $1 \times 10^{-4}$ to $5 \times 10^{-3}$ gram atoms per mole of base material.

The intermediate product is then mixed with at least $1 \times 10^{-5}$ gram atoms per mole of copper and refired in air or in an inert atmosphere at a lower temperature falling within the approximate range 750°–950° C. to produce, after suitable washing, the final phosphor product.

In our investigations of this process we have found that the mean particle size of the phosphors so produced is about 25 microns or larger. In accordance with the principles of our invention this particle size can be reduced, for example to about 1/5 of the above value without significant loss of brightness, and indeed, with somewhat increased efficiency.

More particularly, the intermediate phosphor product produced during the first firing step described in the said copending patent application Serial No. 705,750 is first milled to reduce the particle size to the desired value.

The milled product is then annealed by being fired in air or an inert atmosphere to a temperature falling within the range 600°–1000° C. The annealed product is then mixed with at least $1 \times 10^{-5}$ gram atoms per mole of copper and refired to a temperature falling within the range 750°–950° C. (in the manner set forth in said copending application) to produce the final phosphor product.

An illustrated embodiment of our invention will now be described in more detail with reference to the example which follows.

EXAMPLE

Copper sulfate was thoroughly blended with zinc sulfide powder in an amount sufficient to establish a copper concentration of $1 \times 10^{-3}$ gram atoms per mole of the sulfide mixture. A chloride flux was blended with the mixture in an amount equal to about 8% by weight of the sulfide mixture, this flux consisting of 3% barium chloride, 3% magnesium chloride and 2% sodium chloride, each percentage being by weight of the sulfide mixture. The resulting blend was fired in a covered crucible in air to a temperature of 1150° C. for six hours.

The intermediate product resulting from this firing was divided into seven equal portions. Two portions were not milled, the remaining five portions were separately pebble milled for periods of ½ hour, 2 hours, 4 hours, 7 hours and 10 hours, respectively.

Six portions were then annealed in air at a temperature of 800° C. for a period of five hours. The remaining portion (one of the two unmilled portions) was not annealed. Copper sulfate was then separately added to each portion in an amount sufficient to increase the total copper concentration of each portion by $1 \times 10^{-3}$ gram atoms per mole of zinc sulfide. Each portion was then fired in a covered crucible in air to a temperature of 800° C. for about one hour. The furnace was shut off, and the crucible was permitted to cool for several hours in the furnace before removal. Each portion was then removed from its crucible and washed successively with dilute acetic acid water, 1% potassium cyanide solution and water to produce the final electroluminescent phosphor.

Each sample was then dispersed in castor oil and placed in a lamp 1 inch wide by 1 inch long by 0.005 inch thick. An alternating 1800 cycles per second voltage of 500 volts R.M.S. was then applied across the lamp. The brightness (in foot lamberts), the efficiency (in lumens per watt) and the phosphor particle size of each of the lamps (in microns) was measured, the results being tabulated in Table I below.

Hence, as the milling period was increased from 0 to 10 hours, the particle size decreased from 23 microns to 5.2 microns, the efficiency increased from 1.80 to 2.14 lumens per watt, and the brightness first decreased from 22.0 foot lamberts to a minimum value of 18.0 foot lamberts and then increased to 20 foot lamberts. Milling Table I

| Milling Time, hours | Annealed | Brightness | Efficiency | Particle Size |
|---|---|---|---|---|
| No milling | no | | | |
| No milling | yes | 22.0 | 1.80 | 23.0 |
| ½ | yes | 22.2 | 2.08 | 14.4 |
| 2 | yes | 20.5 | 2.14 | 8.3 |
| 4 | yes | 18.0 | 2.15 | 7.0 |
| 7 | yes | 19.0 | 2.18 | 7.8 |
| 10 | yes | 20.0 | 2.14 | 5.2 | periods somewhat in excess of 10 hours did not produce results appreciably different from those obtained with the 10 hour periods.

It was found that the annealing temperature could range between 600°–1000° C. with substantially unchanged results. As the temperature was varied outside of this range, however, both the brightness and the efficiency of the phosphors so produced began to decrease.

We also found that our process could be incorporated into any of the working examples of said copending application with the same results as indicated above.

What is claimed is:

1. A process for producing an electroluminescent phosphor from a base material of the zinc sulfide type wherein up to 20 mole percent of cadmium can be substituted for an equivalent mole percent of zinc and wherein up to 30 mole percent of selenium can be substituted for an equivalent mole percent of sulfur, said process comprising the steps of mixing said material with a copper activator and at least one halide coactivator selected from the group consisting of chloride, iodide and bromide; firing said mixture to a temperature falling within the approximate range 1000°–1300° C. to produce an intermediate product having absolute activator and coactivator concentrations falling within the same approximate range of $1 \times 10^{-4}$–$5 \times 10^{-3}$ gram atoms per mole of said material; milling said intermediate product to reduce the particle size thereof; annealing the milled product at a temperature falling within the range 600°–1000° C.; mixing at least $1 \times 10^{-5}$ additional gram atoms per mole of said activator with said annealed product; and firing said copper-augmented annealed product to a temperature falling within the approximate range 700°–950° C. to produce said electroluminescent phosphor.

2. A process as set forth in claim 1 wherein said intermediate product is pebble milled.

3. A process for producing an electroluminescent phosphor from an intermediate phosphor product constituted by a base material of the zinc sulfide type (wherein up to 20 mole percent of cadmium can be substituted for an equivalent mole percent of zinc and wherein up to 30 mole percent of selenium can be substituted for an equivalent mole percent of sulfur) together with a copper activator and at least one halide coactivator selected from the group consisting of chloride, iodide and bromide, the absolute activator and coactivator concentrations falling within the same approximate range of $1 \times 10^{-4}$–$5 \times 10^{-3}$ gram atoms per mole of said material; milling said intermediate product to reduce the particle size thereof; annealing the milled product at a temperature falling within the range 600°–1000° C.; mixing at least $1 \times 10^{-5}$ additional gram atoms per mole of said activator with said annealed product; and firing said copper-augmented annealed product to a temperature falling within the approximate range 700°–950° C. to produce said electroluminescent phosphor.

4. A process as set forth in claim 3, wherein said milling step continues for a period falling within the range 2–10 hours.

References Cited in the file of this patent

UNITED STATES PATENTS

| 2,743,238 | Hunt | Apr. 24, 1956 |
| 2,745,811 | Butler | May 15, 1956 |
| 2,807,587 | Butler | Sept. 24, 1957 |
| 2,874,128 | Wachtel | Feb. 17, 1959 |